United States Patent
Warkentin et al.

(10) Patent No.: US 11,150,933 B2
(45) Date of Patent: Oct. 19, 2021

(54) OPTIMIZING HOST CPU USAGE BASED ON VIRTUAL MACHINE GUEST OS POWER AND PERFORMANCE MANAGEMENT

(71) Applicant: VMware, Inc., Palo Alto, CA (US)

(72) Inventors: Andrei Warkentin, North Reading, MA (US); Cyprien Laplace, Cambridge, MA (US); Regis Duchesne, Monts-de-Corsier (CH); Ye Li, Newton, MA (US); Alexander Fainkichen, Southborough, MA (US)

(73) Assignee: VMware, Inc., Palo Alto, CA (US)

( * ) Notice: Subject to any disclaimer, the term of this patent is extended or adjusted under 35 U.S.C. 154(b) by 144 days.

(21) Appl. No.: 16/355,497

(22) Filed: Mar. 15, 2019

(65) Prior Publication Data

US 2019/0213033 A1  Jul. 11, 2019

Related U.S. Application Data (63) Continuation of application No. 15/385,568, filed on Dec. 20, 2016, now Pat. No. 10,282,226.

(51) Int. Cl.

| G06F 9/455  | (2018.01) |
| G06F 11/34  | (2006.01) |
| G06F 1/3287 | (2019.01) |
| G06F 1/3234 | (2019.01) |
| G06F 9/50   | (2006.01) |

(Continued)

(52) U.S. Cl.
CPC ........ *G06F 9/45558* (2013.01); *G06F 1/3234* (2013.01); *G06F 1/3287* (2013.01); *G06F 9/5077* (2013.01); *G06F 11/301* (2013.01); *G06F 11/3409* (2013.01); *G06F 11/3423* (2013.01); *G06F 1/329* (2013.01); *G06F 9/45533* (2013.01); *G06F 9/4856* (2013.01); *G06F 11/3055* (2013.01);

(Continued)

(58) Field of Classification Search
CPC ......... G06F 9/45558; G06F 2009/4557; G06F 9/45533; G06F 9/4856; G06F 1/329; G06F 1/3234; G06F 1/3287; G06F 9/5077; G06F 11/301; G06F 11/3409; G06F 11/3423; G06F 11/3055; G06F 11/3466; G06F 2201/815
USPC .............................. 713/320, 323; 718/1, 102
See application file for complete search history.

(56) References Cited

U.S. PATENT DOCUMENTS

| 2007/0006227 | A1  | 1/2007 | Kinney et al. |
| 2011/0055479 | A1* | 3/2011 | West ..................... G06F 9/4881 711/118 |

(Continued)

OTHER PUBLICATIONS

Office Action dated Mar. 11, 2018; U.S. Appl. No. 15/385,568; (8 pgs.).

(Continued)

*Primary Examiner* — Ji H Bae (57) ABSTRACT

Techniques for optimizing CPU usage in a host system based on VM guest OS power and performance management are provided. In one embodiment, a hypervisor of the host system can capture information from a VM guest OS that pertains to a target power or performance state set by the guest OS for a vCPU of the VM. The hypervisor can then perform, based on the captured information, one or more actions that align usage of host CPU resources by the vCPU with the target power or performance state.

21 Claims, 5 Drawing Sheets

(51) Int. Cl.
*G06F 11/30* (2006.01)
*G06F 1/329* (2019.01)
*G06F 9/48* (2006.01)

(52) U.S. Cl.
CPC .. *G06F 11/3466* (2013.01); *G06F 2009/4557* (2013.01); *G06F 2201/815* (2013.01)

(56) References Cited

U.S. PATENT DOCUMENTS

| | | | | |
|---|---|---|---|---|
| 2012/0084777 | A1* | 4/2012 | Jayamohan | G06F 9/45558 718/1 |
| 2014/0189301 | A1* | 7/2014 | Gorbatov | G06F 1/3206 712/30 |
| 2014/0189704 | A1* | 7/2014 | Narvaez | G06F 9/5094 718/104 |
| 2014/0325511 | A1 | 10/2014 | Aasheim | |
| 2015/0007196 | A1* | 1/2015 | Toll | G06F 9/5083 718/105 |
| 2016/0085596 | A1* | 3/2016 | Nakagawa | G06F 9/5094 718/104 |

OTHER PUBLICATIONS

Office Action dated Sep. 21, 2018; U.S. Appl. No. 15/385,568; (8 pgs.).

\* cited by examiner

OPTIMIZING HOST CPU USAGE BASED ON VIRTUAL MACHINE GUEST OS POWER AND PERFORMANCE MANAGEMENT

CROSS-REFERENCE TO RELATED APPLICATIONS

This application is a continuation of U.S. patent application Ser. No. 15/385,568, filed Dec. 20, 2016, now U.S. Pat. No. 10,282,226, issued May 7, 2019, entitled "Optimizing Host CPU Usage Based on Virtual Machine Guest OS Power and Performance Management," which is incorporated by reference in its entirety for all purposes.

BACKGROUND

As known in the field of computer virtualization, a hypervisor is a software component that provides, on a physical machine (i.e., a host system), an execution environment in which one or more virtual machines (VMs) can run. As part of its duties, the hypervisor provisions a portion of the physical hardware resources of the host system to each VM in the form of a virtual hardware platform (comprising, e.g., virtual CPU(s), guest virtual memory, etc.). A guest operating system (OS) running within each VM carries out workloads using the VM's virtual hardware platform, which causes those workloads to be executed on the host physical hardware mapped to (i.e., backing) the virtual hardware.

For example, in a scenario where a VM is configured to have X virtual CPUs (vCPUs), the hypervisor will allocate to each vCPU a time slice of a host CPU (typically determined by a user-defined CPU "share" or "limit" value). When the guest OS of the VM submits a workload to be executed using the VM's vCPUs, the hypervisor will schedule the workload on the host CPUs that back the vCPUs. The hypervisor will generally perform this scheduling in a manner that ensures the amount of host CPU time (i.e., clock cycles) consumed by each vCPU does not exceed the vCPU's allocated share.

In some cases, the guest OS of a VM may support mechanisms that allow it to set desired power and/or performance states for its vCPU(s) based on, e.g., the nature of the workloads being executed or other criteria. Information regarding the vCPU power/performance states could be useful to the hypervisor in more optimally managing the allocation and use of host CPU resources by each vCPU. However, existing hypervisors are not designed to support and/or leverage these VM-level power and performance mechanisms in order to facilitate host CPU resource optimization.

SUMMARY

Techniques for optimizing CPU usage in a host system based on VM guest OS power and performance management are provided. In one embodiment, a hypervisor of the host system can capture information from a VM guest OS that pertains to a target power or performance state set by the guest OS for a vCPU of the VM. The hypervisor can then perform, based on the captured information, one or more actions that align usage of host CPU resources by the vCPU with the target power or performance state.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof

1. Overview

Embodiments of the present disclosure provide techniques for optimizing the use of host CPU resources by the vCPU(s) of a VM based on per-vCPU power and/or performance management activities performed by the VM's guest OS. At a high level, these techniques involve capturing, by a hypervisor, explicit cues generated by the guest OS regarding desired (i.e., target) power and/or performance states determined for each vCPU. Based on these explicit cues, the hypervisor can take one or more actions that more closely align the vCPU's allocation/use of host CPU resources with the vCPU's target power or performance state, resulting in more efficient overall host CPU usage (as well as potentially improved quality of service for each vCPU).

For example, according to one set of embodiments (referred to herein as the "virtual CPU gating" approach), the hypervisor can trap instances of a "CPU power off" instruction that is implemented in certain guest OSs. Upon trapping an instance of this instruction with respect to a particular vCPU (e.g., vCPU1), the hypervisor can tear down state (also known as "context") information that it maintains for vCPU1, thereby de-scheduling vCPU1 from the host CPU(s) and making the host CPU time slice previously allocated to vCPU1 available to other vCPUs in the same or other VMs. This tear down action also advantageously frees hypervisor memory resources previously dedicated to vCPU1's context.

According to another set of embodiments (referred to herein as the "virtual big.LITTLE" approach), the hypervisor can expose a virtual CPU topology comprising a cluster of higher performance vCPUs and a cluster of lower performance vCPUs to a guest OS that supports big.LITTLE scheduling optimizations. This type of topology is known as a "big.LITTLE" topology. Examples of such big.LITTLE scheduling optimizations include clustered switching, in-kernel buddy switching, and fully heterogeneous use. By exposing a virtual big.LITTLE topology to such a guest OS, two benefits are realized—first, the guest OS is empowered to implement its big.LITTLE scheduling optimizations for the VM's vCPUs, which necessarily results in more efficient host CPU usage in cases where the virtual big.LITTLE topology is backed by a corresponding physical big.LITTLE topology on the host (or in cases where the virtual big and little clusters are assigned different host CPU time slices). Second, the hypervisor can recognize the big.LITTLE scheduling activities initiated by the guest OS and can take steps to further optimize host CPU usage based on this information. For instance, in a scenario where the guest OS swaps a workload from the virtual big cluster to the virtual little cluster (thereby rendering the virtual big cluster idle), the hypervisor can tear down the vCPU contexts associated with the virtual big cluster after some predetermined timeout period. Other types of hypervisor-level actions are also possible depending on the nature of the big.LITTLE optimizations implemented at the VM level.

According to yet another set of embodiments (referred to herein as the "virtual CPU performance states" approach), the hypervisor can expose to the guest OS of a VM a mechanism for setting performance states for the VM's vCPU(s), as modeled under the ACPI Collaborative Processor Performance Control (CPPC) or "P-states" standards. One or both of these standards are supported by most modern operating systems. At the time the guest OS sets a particular performance state (e.g., S1) for a particular vCPU of the VM (e.g., vCPU1), the hypervisor can trap the state setting action, determine an appropriate host CPU time slice for vCPU1 based on state S1, and then modify vCPU1's allocated time slice in accordance with the determined time slice. In this way, the hypervisor can dynamically dial up or dial down the host CPU resources allocated to (and thus used by) each vCPU in synchrony with the vCPU's guest OS-controlled target performance level.

The foregoing and other aspects of the present disclosure are described in further detail in the sections that follow.

2. Example Host System and High-Level Design

Figure 1:
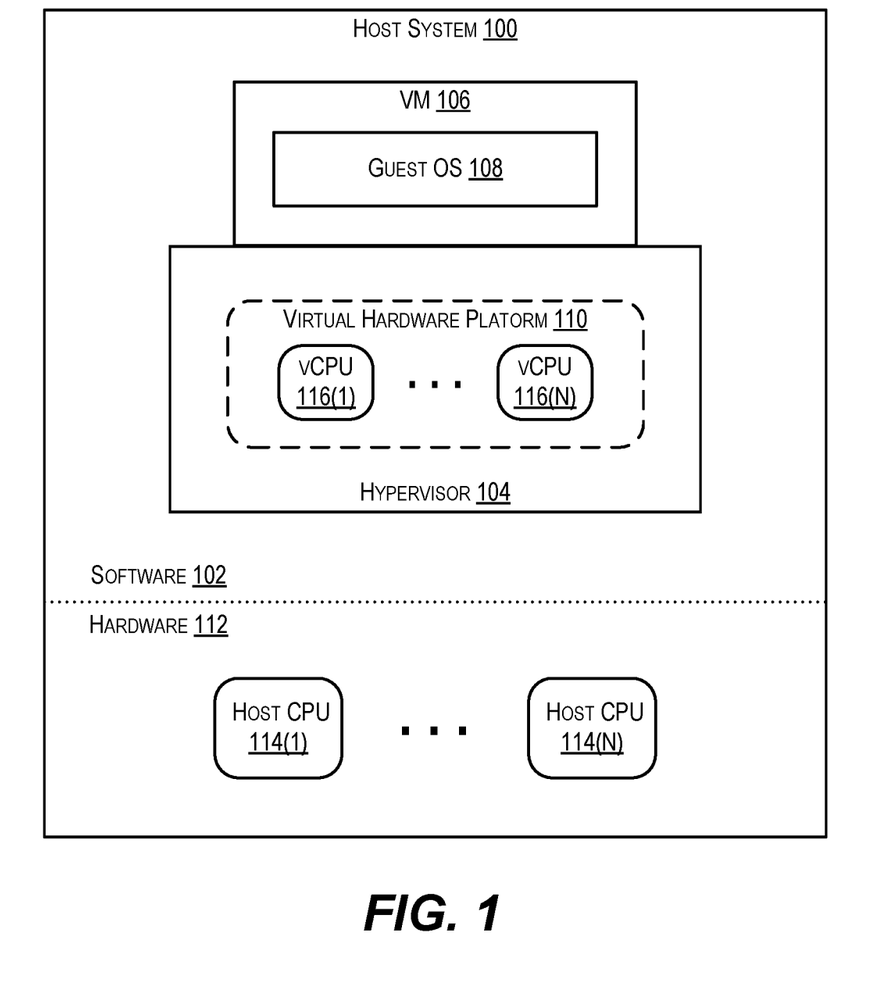
FIG. 1 depicts an example host system according to an embodiment.

FIG. 1 depicts an example host system 100 in which embodiments of the present disclosure may be implemented. As shown, host system 100 includes a software layer 102 that comprises a hypervisor 104 and a VM 106. Although only one VM is depicted for purposes of illustration, any number of VMs may be supported. VM 106 includes a guest OS 108 that executes on top of a virtual hardware platform 110 provisioned by hypervisor 104.

In addition to software layer 102, host system 100 includes a hardware layer 112 that comprises, among other things, a number of host central processing units (CPUs) 114(1)-(N). As used herein, a "CPU" is a computing element that is capable of independently executing a software process or thread. In one set of embodiments, host CPUs 114(1)-(N) may be homogeneous CPUs—in other words, CPUs that are identical or substantially similar in terms of their compute performance. In other embodiments, host CPUs 114(1)-(N) may include heterogeneous CPUs with substantially different performance characteristics. For instance, in a particular embodiment (discussed in section (4) below), host CPUs 114(1)-(N) may be part of a physical big.LITTLE CPU topology comprising a cluster of higher performance CPUs and a cluster of lower performance CPUs.

In the example of FIG. 1, hypervisor 104 is configured to provision a portion (e.g., time slice) of each host CPU 114 to VM 106 in the form of a corresponding virtual CPU (vCPU) 116. These vCPUs 116(1)-(N) are exposed to guest OS 108 of VM 106 as part of virtual hardware platform 110.

As noted the Background section, some guest OSs support power/performance management mechanisms that allow the guest OS to set target power and/or performance states for its vCPUs based on various criteria (e.g., CPU load balancing, power efficiency objectives, etc.). Information regarding these vCPU power/performance states would be highly useful to the hypervisor in efficiently managing host CPU allocation and usage among its VMs/vCPUs; unfortunately, existing hypervisor implementations generally cannot capture and take advantage of this information. In fact, for certain power/performance management mechanisms such as big.LITTLE CPU scheduling, existing hypervisors are not designed to expose appropriate virtual hardware to VMs in a manner that enables the VM guest OSs to execute the mechanisms in the first place.

Figure 2:
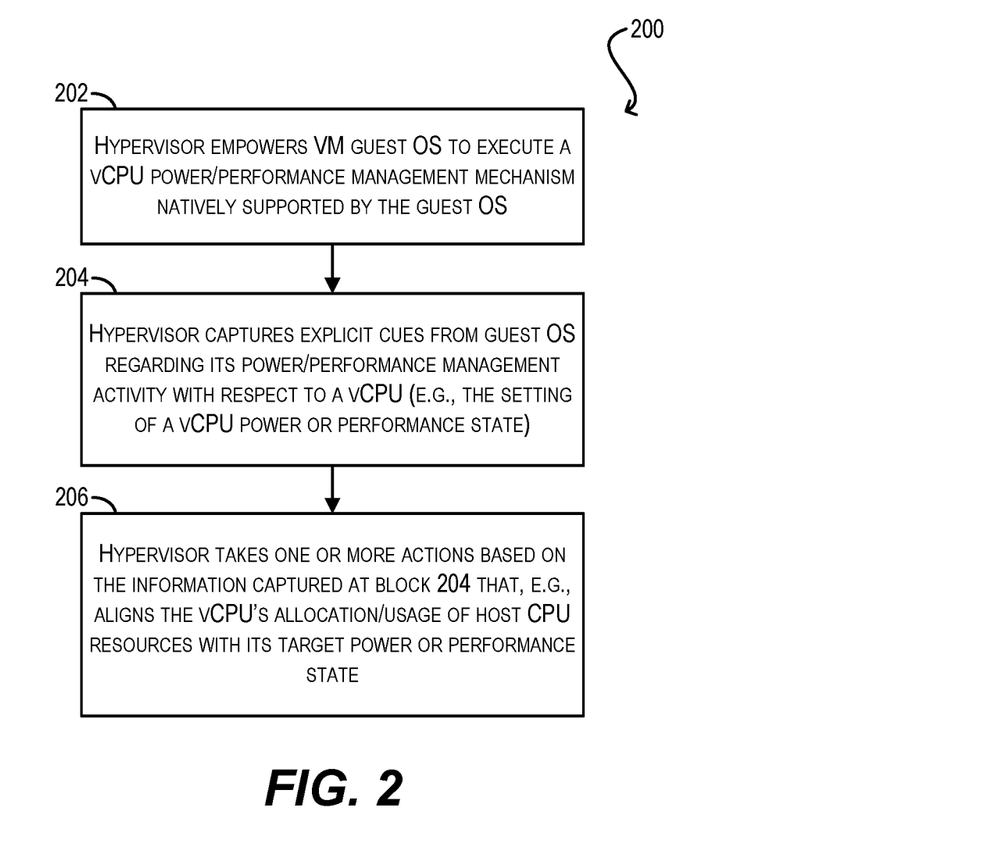
FIG. 2 depicts a high-level workflow for optimizing host CPU usage based on guest OS power/performance management according to an embodiment.

To address these and other similar deficiencies, hypervisor 104 of FIG. 1 can be enhanced to carry out high-level workflow 200 depicted in FIG. 2 according to embodiments of the present disclosure. As shown in FIG. 2, hypervisor 104 can first empower guest OS 108 of VM 106 to execute a vCPU power/performance management mechanism that is supported by the guest OS (block 202). For example, if the mechanism is big.LITTLE CPU scheduling, hypervisor 104 can expose to guest OS 108 a virtual big.LITTLE CPU topology comprising a cluster of higher performance vCPUs and a cluster of lower performance vCPUs. As another example, if the mechanism is ACPI CPPC-based CPU performance state management, hypervisor 104 can emulate appropriate system registers that enable guest OS 108 to read and set vCPU CPPC performance states. In cases where hypervisor 104 does not need to take any steps in order to empower VM-level execution of the mechanism, block 202 can be omitted.

At block 204, while guest OS 108 is running the power/performance management mechanism, hypervisor 104 can capture one or more explicit cues that are generated by guest OS 108 with respect to establishing a target power or performance state for a particular vCPU 116. In one set of embodiments, this can entail trapping a specific command or instruction that is issued by the guest OS for setting the target power or performance state (e.g., a CPU power off instruction, a write to a CPPC register, etc.). In other embodiments, this can entail capturing information regarding other types of VM-level actions that are related to a power/performance management activity.

Then, at block 206, hypervisor 104 can take one or more actions that adjust the vCPU's allocation/usage of host CPU resources in a manner that brings that allocation/usage in line with the vCPU's target power or performance state as captured at block 204. In various embodiments these actions can include, e.g., tearing down hypervisor-level vCPU context information for a vCPU that has been idled or powered off, dynamically modifying the amount of host CPU time (e.g., CPU time slice) allocated to the vCPU, migrating the vCPU from one host CPU to another host CPU, and others. In these ways, hypervisor 104 can advantageously optimize the allocation/use of host CPU resources among the vCPUs of host system 100 in direct response to the power/performance management activities executed at, and gleaned from, the VM level. In addition, as a corollary, the actions taken by hypervisor 104 at block 206 can effectively tune the quality of service provided by each vCPU to better match the guest OS's desired power/performance goals.

The remaining sections of this disclosure provide details regarding three approaches for implementing high-level workflow 200 of FIG. 2: (1) virtual CPU gating, (2) virtual big.LITTLE, and (3) virtual CPU performance states. Although these approaches are discussed separately, it should be appreciated that two or more of the approaches may be implemented concurrently with respect to the same VM or different VMs on a given host system. Further, it should be appreciated that these approaches are illustrative in nature and other possible approaches or techniques for implementing workflow 200 of FIG. 2 are contemplated to be within the scope of the present disclosure.

3. Virtual CPU Gating

Figure 3:
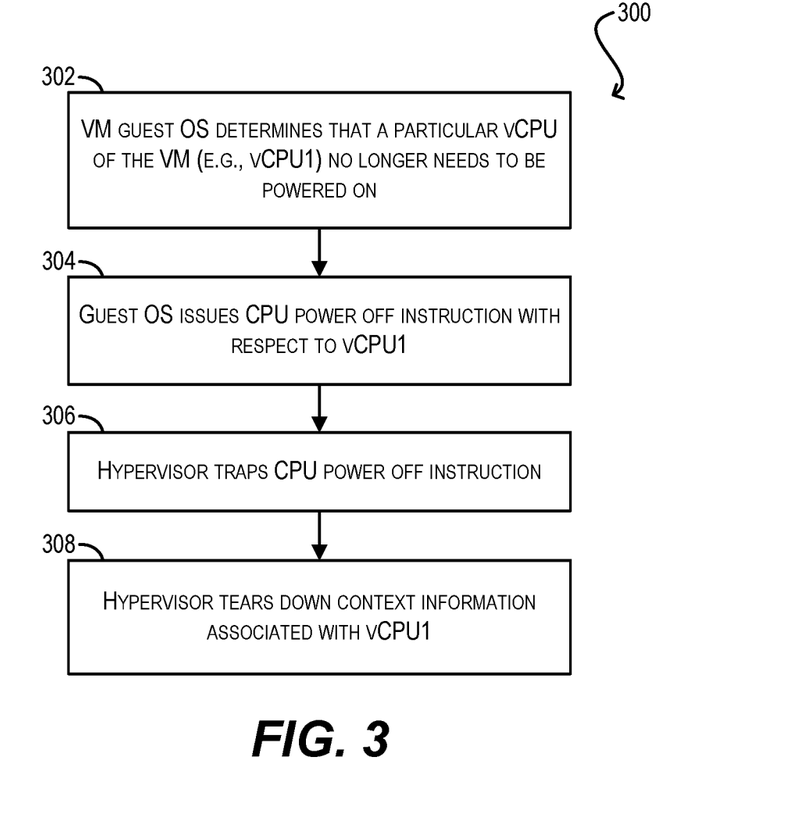
FIG. 3 depicts a workflow for implementing virtual CPU gating according to an embodiment.

Certain CPU architectures, and the OSs that are designed to run on those CPU architectures, support a power management interface that allows the OSs to turn off one or more CPUs during system runtime in order to conserve power or for other purposes. One example of this is the Power State Coordination Interface (PSCI) that is supported by the ARM64 architecture and ARM64-based OSs like ARM64 Linux. In cases where such an OS is used as a guest OS in a VM, the hypervisor running the VM can implement a virtual CPU gating approach that generally involves (1) detecting a CPU power off instruction issued by the guest OS with respect to a vCPU, and (2) tearing down context information maintained by the hypervisor for that vCPU (since the vCPU has been powered off and no longer needs to be scheduled on the host CPU(s)). In this manner, the hypervisor can free host CPU resources previously allocated to the vCPU and can also free hypervisor memory and compute resources previously dedicated to managing/scheduling the vCPU. FIG. 3 depicts a workflow 300 that details this virtual CPU gating approach according to an embodiment.

At block 302, a VM guest OS (which may be, e.g., an ARM64-based OS or any other OS supporting CPU power off) can determine that a particular vCPU (e.g., vCPU1) of the VM no longer needs to be powered on. For example, in one embodiment, the guest OS may be configured to compact the workloads running in the VM on a periodic basis and, upon performing such a compaction, may find that the VM's workloads can be sufficiently run on vCPUs other than vCPU1.

In response to the determination at block 302, the guest OS can issue a CPU power off instruction with respect to vCPU1 (block 304). In the case of an ARM64-based OS, this instruction can specifically correspond to a "PSCI OFF" command. In the case of other OSs, this instruction can correspond to whatever instruction is exposed by the CPU power management interface supported by the OS for initiating a CPU power off action.

At block 306, the hypervisor running the VM can "trap" the CPU power off instruction. Stated another way, the issuance of the CPU power off instruction can trigger a hardware interrupt that causes the host CPU processing the command to transition, or "exit," into a privileged kernel mode in which the hypervisor takes control. As part of this exit process, the hypervisor is made aware that the CPU power off instruction was issued by the guest OS (and was the reason for the exit).

Then, upon trapping the CPU power off instruction, the hypervisor can tear down the hypervisor-level context that is associated with powered-off vCPU1 (block 308). This final step can entail, e.g., deleting from host memory any data structures that are used by the hypervisor for maintaining the execution state of vCPU1, as well as de-scheduling vCPU1 from the host CPU(s) of the system.

4. Virtual Big.LITTLE

The virtual big.LITTLE approach is premised on the notion of presenting, to a VM guest OS that supports big.LITTLE scheduling optimizations (such as various ARM-based OSs), a heterogeneous vCPU topology that comprises a cluster of higher performance (i.e., big) vCPUs and a cluster of lower performance (i.e., little) vCPUs. In one set of embodiments, this virtual big.LITTLE topology may be backed by a corresponding physical big.LITTLE CPU topology on the host system. In another set of embodiments, the virtual big.LITTLE topology may map to a homogenous CPU topology on the host system.

In either case, the presentation of a virtual big.LITTLE topology to the guest OS results in two beneficial consequences. First, the guest OS is empowered to execute its supported big.LITTLE scheduling optimizations (e.g., cluster switching, in-kernel buddy switching, or fully heterogeneous use) with respect to the VM's vCPUs, which will generally result in more efficient CPU usage at the host level. Second, the hypervisor is able to capture information regarding the big.LITTLE scheduling activities performed by the guest OS, which the hypervisor can then leverage to further optimize host CPU allocation/usage among the host's VMs and vCPUs.

Figure 4:
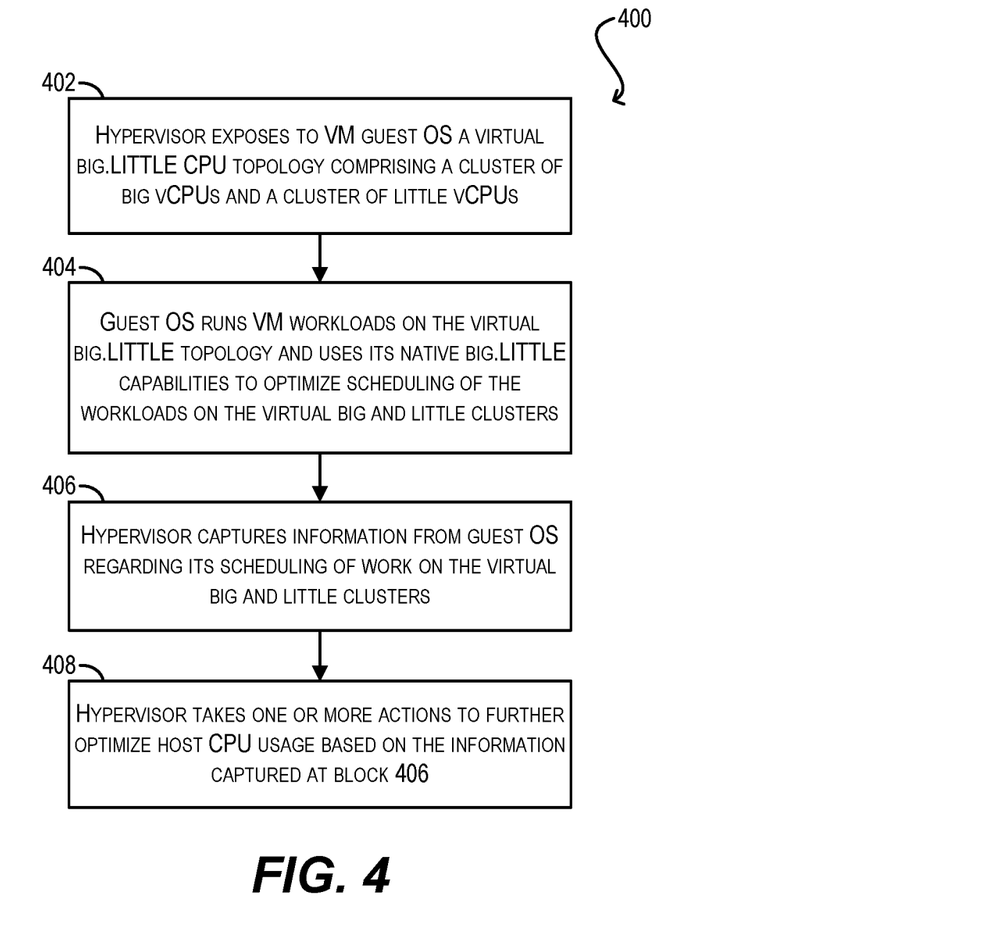
FIG. 4 depicts a workflow for implementing virtual big.LITTLE according to an embodiment.

FIG. 4 depicts a workflow 400 can be performed by a hypervisor and a big.LITTLE-aware VM guest OS for implementing virtual big.LITTLE according to an embodiment. Starting with block 402, the hypervisor can expose, to the guest OS, a virtual big.LITTLE CPU topology including a cluster of big vCPUs and a cluster of little vCPUs. By way of example, if the virtual big.LITTLE topology comprises ARM vCPUs, the big vCPUs may be Cortex A57 cores while the little vCPUs may be Cortex A53 cores.

As mentioned previously, the virtual big.LITTLE topology may be backed on the host system by either (1) a physical big.LITTLE CPU topology or (2) a physical homogeneous CPU topology. In scenario (1), each big vCPU will be mapped to a respective big CPU on the host and each little vCPU will be mapped to respective little CPU on the host. In scenario (2), each big and little vCPU will be mapped to a homogenous host CPU. In this latter case, the CPU time slice assigned to the big vCPUs can be made larger than the CPU time slice assigned to the little vCPUs in order to emulate their differing performance characteristics. For example, the big vCPU cluster may be assigned a CPU time slice of 10% (indicating that each big vCPU is allocated 10% of the clock cycles of the backing host CPU) while the little vCPU cluster may be assigned a CPU time slice of 5% (indicating that each little vCPU is allocated 5% of the clock cycles of the backing host CPU). These per-cluster time slices can be defined by the hypervisor or a user and can be maintained in a configuration file (e.g., VMX file) of the VM.

The specific process by which the hypervisor exposes the virtual big.LITTLE CPU topology to the guest OS at block 402 can involve reporting, to the guest OS, processor identifiers (IDs) that reflect each vCPU's performance class (e.g., reporting the big vCPUs as high performance A57 cores and the little vCPUs as low performance A53 cores). In scenario (1) above, this reporting can be achieved by passing through the processor ID of the backing big or little host CPU to the guest OS via a predefined vCPU register (e.g., the VPIDR_EL2 register for ARM CPUs). In scenario (2) above, this reporting can be achieved by overriding the host CPU processor ID to reflect a big or little CPU as appropriate and writing the overridden processor ID to the predefined vCPU register.

In cases where the guest OS also expects a firmware-level device tree enumerating the CPUs of the system (this typically applies to OSs for embedded systems), the process at block 402 may further involve including device tree definitions for the virtual big.LITTLE topology in the VM's firmware configuration file(s). The listing below illustrates example device tree definitions for a topology comprising two A57 cores and two A53 cores:

Listing 1

```
cpus {
    #address-cells = <1>;
    #size-cells = <0>;
    cpu0: cpu at 100 {
        device_type = "cpu";
```

-continued

Listing 1

```
        compatible = "arm,cortex-a53", "arm,armv8";
        enable-method = "psci";
        reg = <0x100>;
    };
    cpu1: cpu at 101 {
        device_type = "cpu";
        compatible = "arm,cortex-a53", "arm,armv8";
        enable-method = "psci";
        reg = <0x101>;
    };
    cpu2: cpu at 0 {
        device_type = "cpu";
        compatible = "arm,cortex-a57", "arm,armv8";
        enable-method = "psci";
        reg = <0x000>;
    };
    cpu3: cpu at 1 {
        device_type = "cpu";
        compatible = "arm,cortex-a57", "arm,armv8";
        enable-method = "psci";
        reg = <0x001>;
    };
};
```

Once the hypervisor has exposed the virtual big.LITTLE topology to the guest OS, the guest OS can run VM workloads on the topology per its normal operation and, as part of this, can use its big.LITTLE capabilities to optimize scheduling of the workloads on the virtual big and little clusters (block 404). This will generally result in more efficient and effective host CPU usage. For example, assume that the virtual big.LITTLE topology is backed by a physical big.LITTLE topology. In this case, if the guest OS moves a workload from the virtual big cluster to the virtual little cluster because, e.g., the workload is not compute intensive, that workload will also be moved from the physical big cluster to the physical little cluster, thereby increasing the available compute capacity of the physical big cluster for other tasks. Conversely, if the guest OS moves a workload from the virtual little cluster to the virtual big cluster because, e.g., the workload requires more compute resources, that workload will also be moved from the physical little cluster to the physical big cluster, resulting in more host CPU power being devoted to the workload.

Similar logic applies in the scenario where the virtual big.LITTLE topology is backed by a physical homogenous CPU topology. In this case, since the vCPUs of the virtual little cluster are assigned a smaller host CPU time slice than the vCPUs of the virtual big cluster as noted above, any switching of work from the virtual big cluster to the virtual little cluster will result in more efficient use of physical CPU resources, and any switching of work from the virtual little cluster to the virtual big cluster will enable more physical CPU time to be devoted to that work.

Finally, at blocks 406 and 408 of workflow 400, the hypervisor can capture information from the guest OS regarding the guest OS's scheduling of work on the virtual big.LITTLE topology and, using this information, can take one or more actions to further optimize host CPU usage. For example, if the hypervisor sees that the guest OS has idled the virtual big cluster, after some threshold period of time the hypervisor can release the vCPU contexts associated with the vCPUs in that cluster. As another example, if the hypervisor sees that the guest OS has modified the load on one or more vCPUs, the hypervisor can dynamically modify the host CPU time slice allocated to those vCPUs, or change the placement of the vCPUs on the physical CPU topology (e.g., move the vCPU from the physical little cluster to the physical big cluster or vice versa). One of ordinary skill in the art will recognize other variations, modifications, and alternatives for the actions that may be taken by the hypervisor at block 406.

One potential issue with the virtual big.LITTLE approach shown in FIG. 4 is VM migration. For instance, consider a scenario where a VM running on a source host system is presented a virtual big.LITTLE CPU topology that is backed by a physical big.LITTLE CPU topology, and the VM is subsequently migrated to a destination host system that does not support physical big.LITTLE (i.e., the destination host has homogenous physical CPUs). In this scenario, the little vCPUs of the VM will be assigned a host CPU time slice that will be relative to the physical little CPUs on the source host system, and thus this time slice value will not be appropriate after the migration to the destination host system (since the homogenous CPUs on the destination will have different performance characteristics than the little CPUs on the source).

To address this, in certain embodiments the vCPU topology of the VM may be assigned three different CPU time slice values: a first value that applies to the virtual big cluster, a second value that applies to the virtual little cluster in the specific case where the virtual little cluster is backed by a physical little cluster, and a third value that applies to the virtual little cluster in the specific case where the virtual little cluster is not backed by a physical little cluster. With this solution, the second value can used while the VM is running on a host system with a physical big.LITTLE topology (e.g., the source host in the example above) and the third value can be used while the VM is running on a host system with a homogenous CPU topology (e.g., the destination host in the example above).

5. Virtual CPU Performance States

The virtual CPU performance states approach takes advantage of the ACPI CPPC (or older "P-states") standard that is supported by most modern OSs to facilitate host CPU resource optimization. As known in the art, ACPI CPPC is a CPU architecture-agnostic framework that enables an OS to manage the performance of a system's CPUs. In particular, CPPC comprises a number of performance control registers (defined per-CPU) that the OS uses to read out and set the performance level (i.e., state) of each CPU. The performance states can be defined as a function of CPU frequency, power scaling, and/or other factors. CPPC also comprises per-CPU data structures that describe to the OS the hardware capabilities of each CPU and the locations of the CPU's performance control registers.

Figure 5:
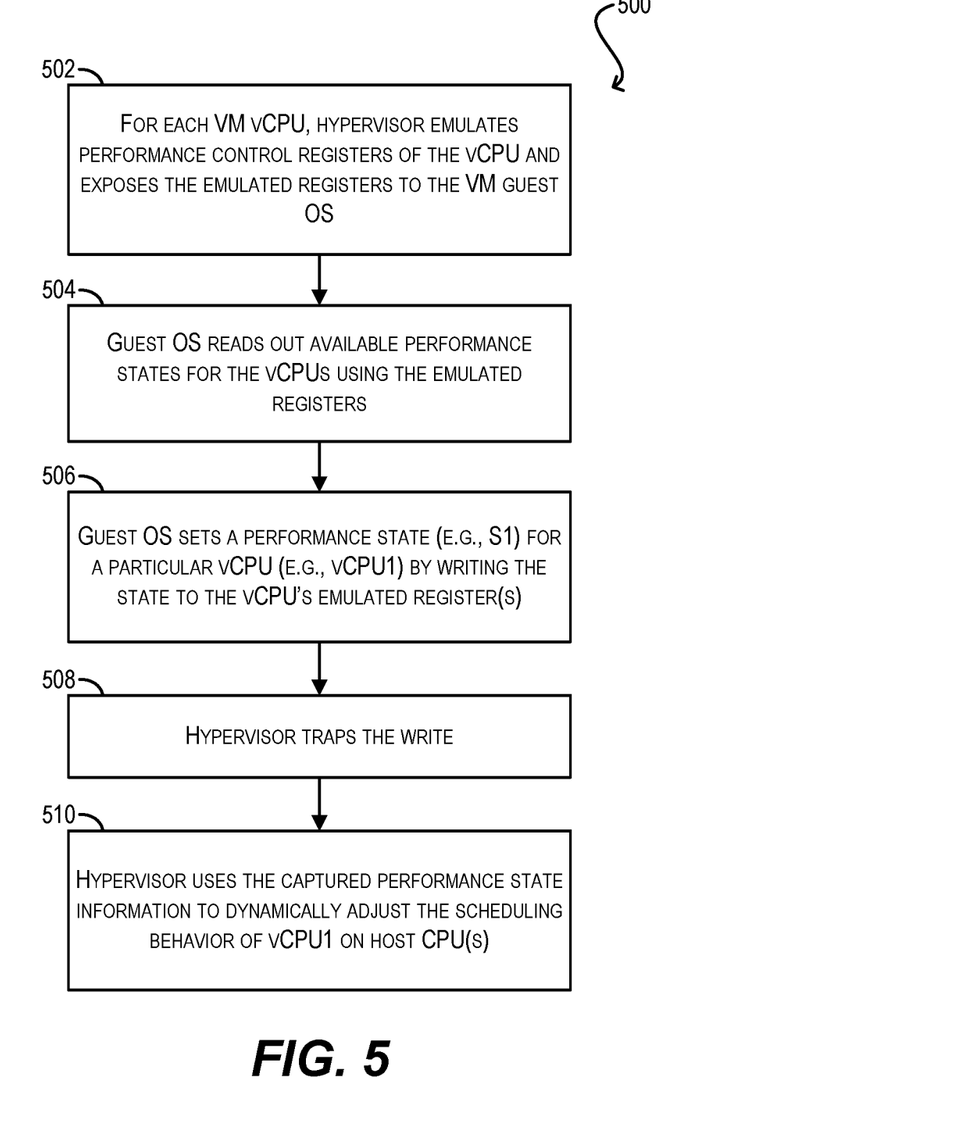
FIG. 5 depicts a workflow for implementing virtual CPU performance states according to an embodiment.

With the virtual CPU performance states approach, a hypervisor can emulate the performance control registers for each vCPU of a VM and can expose these emulated registers to the VM's guest OS. This enables the guest OS to set performance states for the vCPUs via the emulated registers, per the guest OS's in-built ACPI CPPC capabilities. Upon detecting the establishment of a vCPU CPPC performance state (i.e., a write to the vCPU's performance control register(s)), the hypervisor can use the state information to dynamically modify the host CPU time slice allocated to the vCPU (and/or the vCPU's placement on the host CPU topology). In this way, the hypervisor can tune the amount of physical CPU resources available to the vCPU based on the vCPU's target CPPC performance level. FIG. 5 depicts a workflow 500 that details this process according to an embodiment.

At block 502, a hypervisor can, for each vCPU of a VM, emulate performance control registers of the vCPU (per, e.g., the ACPI CPPC standard) and can expose the emulated performance control registers to the VM's guest OS. In one embodiment, the hypervisor can perform this emulation by defining a portion of the guest virtual memory of the VM as representing the performance control registers and trapping access to it. In another embodiment, the hypervisor can perform this emulation using ACPI Platform Communication Channel (PCC), which is a shared memory communication channel. In yet another embodiment, the hypervisor can perform this emulation using "fixed function hardware" defined for the vCPUs.

At block 504, the guest OS can read out, using the emulated performance control registers, the available performance states for the vCPUs. These performance states are defined in per-vCPU ACPI data structures which can be stored in one or more firmware configuration files of the VM. Further, at block 506, the guest OS can set a particular performance state (e.g., S1) for a particular vCPU (e.g., vCPU1) by writing the performance state to one or more of the vCPU1's emulated performance control registers.

At block 508, the hypervisor can trap the write and thereby determine that the performance state for vCPU1 has been set to S1. Finally, at block 510, the hypervisor can use this performance state information to dynamically change the scheduling behavior of vCPU1 on the host CPU(s). For instance, in one embodiment the hypervisor increase or decrease the host CPU time slice allocated to vCPU1, depending on whether the vCPU has transitioned to a higher performance or lower performance state. In other embodiments, the hypervisor can take other actions, such as changing the placement of the vCPU1 on the host CPU topology, changing hardware thread priorities (if the vCPUs are mapped to hardware threads), and so on.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
   making visible, by a hypervisor of a host system to a guest operating system (OS) of a virtual machine (VM) running on the hypervisor, a virtual CPU topology that includes a cluster of one or more higher performance virtual CPUs (vCPUs) and a cluster of one or more lower performance virtual CPUs (vCPUs),
   wherein the making visible comprises reporting, by the hypervisor to the guest OS, a first performance class for the one or more higher performance vCPUs and a second performance class different from the first performance class for the one or more lower performance vCPUs, and
   wherein in response to the virtual CPU topology being made visible to the guest OS, the guest OS executes one or more scheduling optimizations for optimizing scheduling of the one or more higher performance vCPUs and the one or more lower performance vCPUs.

2. The method of claim 1 wherein the one or more scheduling optimizations including switching a VM workload from running on the cluster of one or more higher performance vCPUs to running on the cluster of one or more lower performance vCPUs.

3. The method of claim 1 wherein the cluster of one or more higher performance vCPUs map to a cluster of one or more higher performance physical CPUs in the host system, and wherein the cluster of one or more lower performance vCPUs map to a cluster of one or more lower performance physical CPUs in the host system.

4. The method of claim 1 wherein the cluster of one or more higher performance vCPUs and the cluster of one or more lower performance vCPUs map to a single cluster of homogenous performance physical CPUs in the host system.

5. The method of claim 1 further comprising:
   capturing, by the hypervisor, information from the guest OS pertaining to the one or more scheduling optimizations; and
   performing, by the hypervisor, one or more actions based on the captured information that modifies usage of host CPU resources in accordance with the one or more scheduling optimizations.

6. The method of claim 1 wherein the hypervisor makes the virtual CPU topology visible to the guest OS by including one or more device tree definitions identifying the virtual CPU topology in a firmware configuration file for the VM.

7. The method of claim 1 wherein the cluster of one or more lower performance vCPUs is assigned:
   a first CPU time slice value that applies to each lower performance vCPU when the cluster of one or more lower performance vCPUs maps to a cluster of one or more lower performance physical CPUs in the host system; and
   a second CPU time slice value that applies to each lower performance vCPU when the cluster of one or more higher performance vCPUs and the cluster of one or more lower performance vCPUs map to a single cluster of homogenous performance physical CPUs in the host system.

8. A non-transitory computer readable storage medium having stored thereon program code executable by a hypervisor of a host system, the program code embodying a method comprising:
   making visible to a guest operating system (OS) of a virtual machine (VM) running on the hypervisor a virtual CPU topology that includes a cluster of one or more higher performance virtual CPUs (vCPUs) and a cluster of one or more lower performance virtual CPUs (vCPUs),
   wherein the making visible comprises reporting, by the hypervisor to the guest OS, a first performance class for the one or more higher performance vCPUs and a second performance class different from the first performance class for the one or more lower performance vCPUs, and
   wherein in response to the virtual CPU topology being made visible to the guest OS, the guest OS executes one or more scheduling optimizations for optimizing scheduling of the one or more higher performance vCPUs and the one or more lower performance vCPUs.

9. The non-transitory computer readable storage medium of claim 8 wherein the one or more scheduling optimizations including switching a VM workload from running on the cluster of one or more higher performance vCPUs to running on the cluster of one or more lower performance vCPUs.

10. The non-transitory computer readable storage medium of claim 8 wherein the cluster of one or more higher performance vCPUs map to a cluster of one or more higher performance physical CPUs in the host system, and wherein the cluster of one or more lower performance vCPUs map to a cluster of one or more lower performance physical CPUs in the host system.

11. The non-transitory computer readable storage medium of claim 8 wherein the cluster of one or more higher performance vCPUs and the cluster of one or more lower performance vCPUs map to a single cluster of homogenous performance physical CPUs in the host system.

12. The non-transitory computer readable storage medium of claim 8 wherein the method further comprises:
   capturing information from the guest OS pertaining to the one or more scheduling optimizations; and
   performing one or more actions based on the captured information that modifies usage of host CPU resources in accordance with the one or more scheduling optimizations.

13. The non-transitory computer readable storage medium of claim 8 wherein the hypervisor makes the virtual CPU topology visible to the guest OS by including one or more device tree definitions identifying the virtual CPU topology in a firmware configuration file for the VM.

14. The non-transitory computer readable storage medium of claim 8 wherein the cluster of one or more lower performance vCPUs is assigned:
- a first CPU time slice value that applies to each lower performance vCPU when the cluster of one or more lower performance vCPUs maps to a cluster of one or more lower performance physical CPUs in the host system; and
- a second CPU time slice value that applies to each lower performance vCPU when the cluster of one or more higher performance vCPUs and the cluster of one or more lower performance vCPUs map to a single cluster of homogenous performance physical CPUs in the host system.

15. A host system comprising:
- a plurality of host central processing units (CPUs);
- a hypervisor;
- a virtual machine (VM) running on top of the hypervisor, the VM including a guest operating system (OS); and
- a non-transitory computer readable medium having stored thereon program code that, when executed by the hypervisor, causes the hypervisor to make visible to the guest OS of the VM a virtual CPU topology that includes a cluster of one or more higher performance virtual CPUs (vCPUs) and a cluster of one or more lower performance virtual CPUs (vCPUs),
- wherein the making visible comprises reporting, by the hypervisor to the guest OS, a first performance class for the one or more higher performance vCPUs and a second performance class different from the first performance class for the one or more lower performance vCPUs, and
- wherein in response to the virtual CPU topology being made visible to the guest OS, the guest OS executes one or more scheduling optimizations for optimizing scheduling of the one or more higher performance vCPUs and the one or more lower performance vCPUs.

16. The host system of claim 15 wherein the one or more scheduling optimizations including switching a VM workload from running on the cluster of one or more higher performance vCPUs to running on the cluster of one or more lower performance vCPUs.

17. The host system of claim 15 wherein the cluster of one or more higher performance vCPUs map to a cluster of one or more higher performance physical CPUs in the host system, and wherein the cluster of one or more lower performance vCPUs map to a cluster of one or more lower performance physical CPUs in the host system.

18. The host system of claim 15 wherein the cluster of one or more higher performance vCPUs and the cluster of one or more lower performance vCPUs map to a single cluster of homogenous performance physical CPUs in the host system.

19. The host system of claim 15 wherein the program code further causes the hypervisor to:
- capture information from the guest OS pertaining to the one or more scheduling optimizations; and
- perform one or more actions based on the captured information that modifies usage of host CPU resources in accordance with the one or more scheduling optimizations.

20. The host system of claim 15 wherein the hypervisor makes the virtual CPU topology visible to the guest OS by including one or more device tree definitions identifying the virtual CPU topology in a firmware configuration file for the VM.

21. The host system of claim 15 wherein the cluster of one or more lower performance vCPUs is assigned:
- a first CPU time slice value that applies to each lower performance vCPU when the cluster of one or more lower performance vCPUs maps to a cluster of one or more lower performance physical CPUs in the host system; and
- a second CPU time slice value that applies to each lower performance vCPU when the cluster of one or more higher performance vCPUs and the cluster of one or more lower performance vCPUs map to a single cluster of homogenous performance physical CPUs in the host system.

* * * * *